(12) United States Patent
Anderson

(10) Patent No.: US 7,580,254 B2
(45) Date of Patent: Aug. 25, 2009

(54) APPARATUS, SYSTEM, AND METHOD FOR SECURE STORAGE BAY FOR AN ELECTRONIC HANDHELD DEVICE

(76) Inventor: David Anderson, 1790 River Gorge Dr., Reno, NV (US) 89521

( * ) Notice: Subject to any disclaimer, the term of this patent is extended or adjusted under 35 U.S.C. 154(b) by 357 days.

(21) Appl. No.: 11/551,209

(22) Filed: Oct. 19, 2006

(65) Prior Publication Data

US 2007/0087725 A1    Apr. 19, 2007

Related U.S. Application Data

(60) Provisional application No. 60/728,231, filed on Oct. 19, 2005.

(51) Int. Cl.
 *H05K 5/00* (2006.01)
 *H05K 7/00* (2006.01)
 *A47B 81/00* (2006.01)
 *A47B 97/00* (2006.01)

(52) U.S. Cl. .............................. 361/679.41; 312/223.2

(58) Field of Classification Search ................ 361/724, 361/725, 727, 679.41; 312/223.2
See application file for complete search history.

(56) References Cited

U.S. PATENT DOCUMENTS

| | | | |
|---|---|---|---|
| 4,533,791 A | 8/1985 | Read et al. ................... 179/2 R |
| 5,528,667 A | 6/1996 | Steffensen et al. ............ 379/58 |
| 5,537,343 A | 7/1996 | Kikinis et al. | |
| 6,035,214 A | 3/2000 | Henderson ................... 455/556 |
| 6,049,453 A | 4/2000 | Hulsebosch | |
| 6,102,476 A | 8/2000 | May et al. ................. 297/217.3 |
| 6,144,549 A | 11/2000 | Moss et al. | |
| D440,542 S | 4/2001 | Hawkins et al. ............ D14/100 |
| 6,231,145 B1 * | 5/2001 | Liu ......................... 312/332.1 |
| 6,231,371 B1 * | 5/2001 | Helot .......................... 439/374 |
| 6,330,151 B1 * | 12/2001 | Bates, III ..................... 361/686 |
| 6,388,878 B1 * | 5/2002 | Chang ......................... 361/687 |
| 6,538,880 B1 | 3/2003 | Kamijo et al. .............. 361/686 |
| D472,900 S | 4/2003 | Matsumoto ................ D14/447 |
| 6,591,085 B1 | 7/2003 | Grady .......................... 455/42 |
| 6,626,686 B1 | 9/2003 | D'Souza et al. ............. 439/131 |
| 6,654,251 B2 | 11/2003 | Yun ............................ 361/724 |
| 6,693,586 B1 | 2/2004 | Walters et al. ......... 342/357.13 |
| 6,760,600 B2 | 7/2004 | Nickum ...................... 455/557 |
| 6,763,252 B2 | 7/2004 | Itazawa ................... 455/575.1 |
| D495,336 S | 8/2004 | Andre et al. ................ D14/434 |
| 6,961,237 B2 * | 11/2005 | Dickie ......................... 361/683 |
| 7,110,574 B2 * | 9/2006 | Haruki et al. ................ 382/115 |
| 2002/0086703 A1 | 7/2002 | Dimenstein et al. ......... 455/557 |
| 2002/0169001 A1 | 11/2002 | Itazawa ....................... 455/557 |

(Continued)

*Primary Examiner*—Jayprakash N Gandhi
*Assistant Examiner*—Anthony M Haughton
(74) *Attorney, Agent, or Firm*—Kunzler & McKenzie

(57) ABSTRACT

An apparatus, system, and method are disclosed for secure storage of an electronic handheld device. The apparatus may include a retractable tray having a surface for receiving the electronic handheld device, an electrical connector within the retractable tray for making electrical connection with the electronic handheld device, and the retractable tray having an exterior housing with electrical connectors for being received within a fixed electronic device. The system includes the apparatus, and a data communications link coupling the apparatus with a fixed electronic device. The method includes receiving an electronic handheld device, making an electrical connection with the electronic handheld device through a retractable tray, and retracting the electrical device within an exterior housing, the exterior housing having electrical connectors for connecting with a fixed electronic device.

20 Claims, 11 Drawing Sheets

U.S. PATENT DOCUMENTS

| | | |
|---|---|---|
| 2004/0171346 A1 | 9/2004 | Lin .......................... 455/3.05 |
| 2004/0193765 A1* | 9/2004 | Hsiao et al. ................... 710/72 |
| 2004/0224638 A1 | 11/2004 | Fadell et al. ................ 455/66.1 |
| 2005/0014536 A1 | 1/2005 | Grady ........................ 455/573 |

* cited by examiner

| Function | Pin | Description |
| --- | --- | --- |
| Firewire | 1 | VP (Power) |
| Firewire | 2 | VG (Ground) |
| Firewire | 3 | TPB (Transmit Strobe) |
| Firewire | 4 | TPB (Transmit Strobe) |
| Firewire | 5 | TPA (Transmit Receive) |
| Firewire | 6 | TPA (Transmit Receive) |
| USB 2.0 | 7 | VBUS (Power) |
| USB 2.0 | 8 | D- (Data -) |
| USB 2.0 | 9 | D+ (Data +) |
| USB 2.0 | 10 | Gnd (Ground) |
| Audio/Video | 11 | R+ (Right Line Out) |
| Audio/Video | 12 | L+ (Left Line Out) |
| Audio/Video | 13 | R- (Right Line In) |
| Audio/Video | 14 | L- (Left Line In) |
| Audio/Video | 15 | Video Out |
| Audio/Video | 16 | Gnd (Ground) |
| Data Xfer | 17 | Tx (Data Transmit) |
| Data Xfer | 18 | Rx (Data Receive) |
| Data Xfer | 19 | Gnd (Data Ground) |
| Data Xfer | 20 | Strobe (Data Strobe Enable) |
| Reserved | 21 | Reserved |
| Reserved | 22 | Reserved |
| Keypad | 23 | PWR (Keypad Power) |
| Keypad | 24 | Gnd (Keypad Ground) |
| Keypad | 25 | Data (Keypad Data) |
| Keypad | 26 | Clk (Keypad Clock) |
| Sync Button | 27 | Pwr (Sync Button Power) |
| Sync Button | 28 | Gnd (Sync Button Ground) |
| Open/Close Button | 29 | Pwr (Open/Close Button Power) |
| Open/Close Button | 30 | Gnd (Open/Close Button Ground) |
| Keylock | 31 | Pwr (Keylock Power) |
| Keylock | 32 | Gnd (Keylock Ground) |
| Unit Power | 33 | Gnd (Unit Ground) |
| Unit Power | 34 | 3.3 VDC (Unit Power) |
| Unit Power | 35 | 5.5 VDC (Unit Power) |
| Unit Power | 36 | 12 VCD (Unit Power) |

FIG. 9

| Function | Pin | Description |
|---|---|---|
| LCD Display | 37 | Vss (Power Vss LCD) |
| LCD Display | 38 | Vdd (Power Vdd 5V LCD) |
| LCD Display | 39 | Vo (PowerLCD) |
| LCD Display | 40 | RS (Reset LCD) |
| LCD Display | 41 | R/W (Read/Write LCD) |
| LCD Display | 42 | E (Enable LCD) |
| LCD Display | 43 | DB0 (Dataline 0 LCD) |
| LCD Display | 44 | DB1 (Dataline 1 LCD) |
| LCD Display | 45 | DB2 (Dataline 2 LCD) |
| LCD Display | 46 | DB3 (Dataline 3 LCD) |
| LCD Display | 47 | DB4 (Dataline 4 LCD) |
| LCD Display | 48 | DB5 (Dataline 5 LCD) |
| LCD Display | 49 | DB6 (Dataline 6 LCD) |
| LCD Display | 50 | DB7 (Dataline 7 LCD) |
| Optical Switch | 51 | Pwr (Power) |
| Optical Switch | 52 | Gnd (Ground) |
| Status LED1 | 53 | Pwr (Power) |
| Status LED1 | 54 | Gnd (Ground) |
| Status LED2 | 55 | Pwr (Power) |
| Status LED2 | 56 | Gnd (Ground) |
| Status LED3 | 57 | Pwr (Power) |
| Status LED3 | 58 | Gnd (Ground) |
| Status LED4 | 59 | Pwr (Power) |
| Status LED4 | 60 | Gnd (Ground) |
| Status LED5 | 61 | Pwr (Power) |
| Status LED5 | 62 | Gnd (Ground) |
| Reserved | 63 | Reserved |
| Reserved | 64 | Reserved |
| Reserved | 65 | Reserved |
| Reserved | 66 | Reserved |
| Reserved | 67 | Reserved |
| Reserved | 68 | Reserved |

FIG. 9 (cont.)

APPARATUS, SYSTEM, AND METHOD FOR SECURE STORAGE BAY FOR AN ELECTRONIC HANDHELD DEVICE

CROSS-REFERENCES TO RELATED APPLICATIONS

This application is a continuation-in-part of and claims priority to U.S. Provisional Patent Application No. 60/728,231 entitled "APPARATUS, SYSTEM, AND METHOD FOR SECURE STORAGE BAY FOR AN EXLECTRONIC HANDHELD DEVICE" and filed on Oct. 19, 2005 for David Anderson, which is incorporated herein by reference.

BACKGROUND OF THE INVENTION

1. Field of the Invention

This invention relates to electronic handheld or portable devices and more particularly relates to an apparatus, system, and method for securing and interfacing with the electronic device.

2. Description of the Related Art

Portable electronic devices have become increasingly popular because of the many functions the devices can perform. These functions can include playing music and videos, making phone calls, global positioning, displaying games and ebooks, taking pictures, etc.

Many such devices have provisions which allow electronic handheld devices to connect to larger, fixed computers or other devices to exchange data. The current state of the technology usually involves either attaching a cord directly from the fixed computer to the electronic handheld device, or by docking the device in a stand-alone cradle. Wireless technology can also be used to connect the electronic handheld device and the computer. However, oftentimes a corded connection is beneficial because the batteries of the electronic handheld device are charged through the connection with the computer as well.

The apparatuses and methods for connecting a electronic handheld device to a larger computer currently available rarely do more than exchange data and/or charge batteries. For example, while the electronic handheld device is docked with the fixed device, the electronic handheld device sits in open view, either in a stand-alone cradle, or resting directly on a desk or other surface. While this may be acceptable in a home or home office environment, in a place or work of education an expensive electronic device sitting in open view unfortunately invites theft.

From the foregoing discussion, it should be apparent that a need exists for an apparatus, system, and method that securely stores an electronic handheld device. Beneficially, such an apparatus, system, and method would provide secure storage and simultaneously provide a data connection with a host device such as a computer.

SUMMARY OF THE INVENTION

From the foregoing discussion, it should be apparent that a need exists for an apparatus, system, and method that securely stores an electronic device. Beneficially, such an apparatus, system, and method would both securely store the device and provide an electrical connection for synching with the device.

The present invention has been developed in response to the present state of the art, and in particular, in response to the problems and needs in the art that have not yet been fully solved by currently available apparatuses. Accordingly, the present invention has been developed to provide an apparatus, system, and method for secure storage for an electronic handheld device that overcome many or all of the above-discussed shortcomings in the art.

The apparatus is provided with a retractable tray having a surface for receiving the electronic handheld device, an electrical connector within the retractable tray for making electrical connection with the electronic handheld device, and the retractable tray having an exterior housing with electrical connectors for being received within a fixed electronic device.

In one embodiment, the apparatus includes an adapter having a first set of electrical connectors for mateably connecting with the electrical connector on the retractable tray and a second set of electrical connectors for mateably connecting with the electrical handheld device. The apparatus may also include a locking mechanism disposed on a faceplate connected with the retractable tray such that the locking mechanism secures the retractable tray in a closed position.

The apparatus may also comprise software for accessing the electronic handheld device through the fixed electronic device when the electronic handheld device is secured in the secure storage bay. The software may comprise a sync module located on a computing device or alternatively operably coupled with the storage bay. In one embodiment, the apparatus includes a dummy faceplate attached to the retractable tray, and an LCD screen attached to the retractable tray.

In a further embodiment, the LCD screen is configured to emulate a control layout of the electronic device. The retractable tray comprises a dynamically positionable cradle. The fixed electronic device may be selected from a group consisting of a computer, a stereo receiver, a car stereo, and an external housing in communication with a computer.

A system of the present invention is also presented. The system may comprise the above described apparatus and a data communication link between the apparatus and a computing system or fixed electronic device.

A method of the present invention is also presented. The method in the disclosed embodiments substantially includes the steps necessary to carry out the functions presented above with respect to the operation of the described apparatus and system. In one embodiment, the method includes receiving an electronic handheld device, making an electrical connection with the electronic handheld device through a retractable tray, and retracting the electrical device within an exterior housing, the exterior housing having electrical connectors for connecting with a fixed electronic device.

The method may also include mateably connecting with the electrical connector on the retractable tray with the electrical handheld device, and securing the retractable tray in a closed position.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 is a table illustrating one embodiment for pinouts in accordance with the present invention.

DETAILED DESCRIPTION OF THE INVENTION

Figure 1:
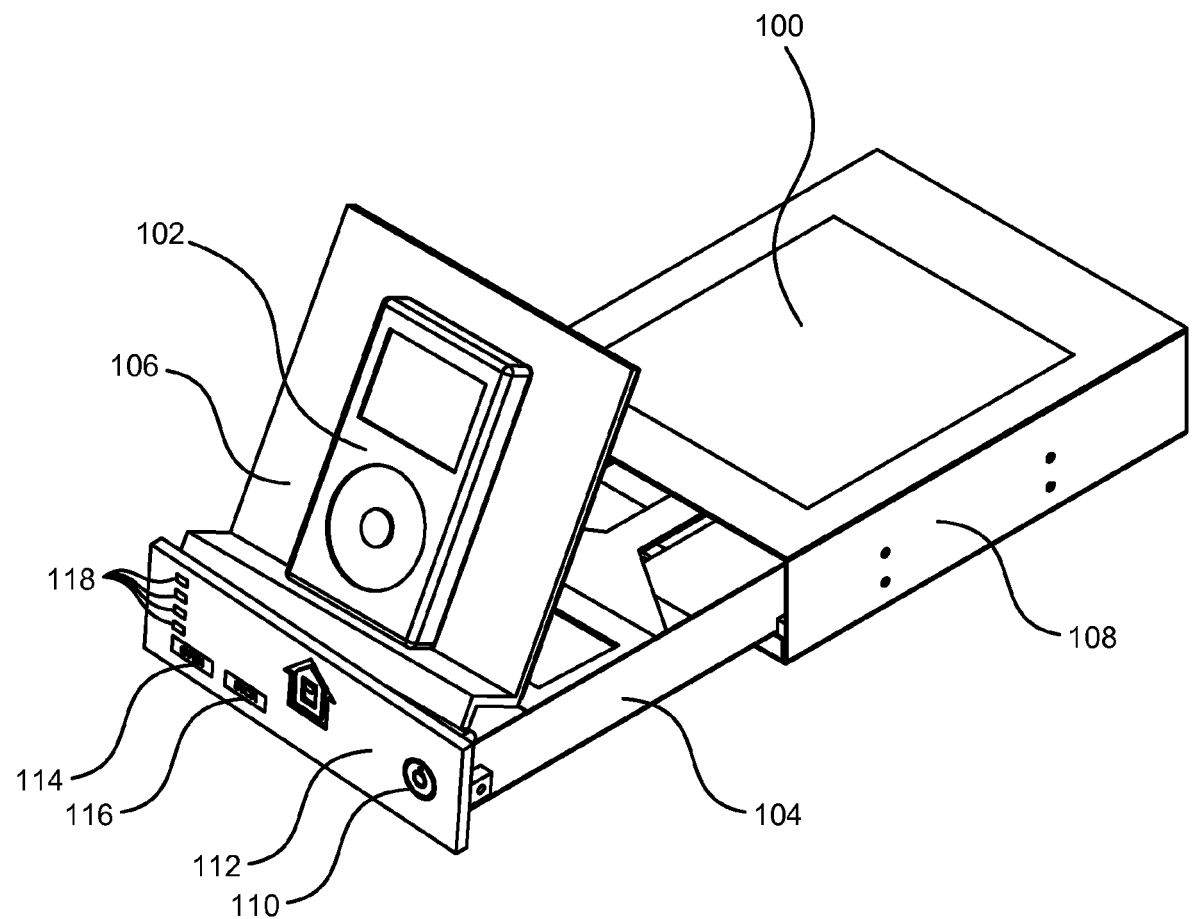
FIG. 1 is a perspective view diagram illustrating one embodiment of an apparatus in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Electronic handheld devices, such as personal digital assistants, digital media players, mobile telephones and digital cameras are becoming more complex, useful and ubiquitous. Many such devices have provisions which allow electronic handheld devices to connect to larger, fixed computers or other devices to exchange data. The current state of the technology usually involves either attaching a cord directly from the fixed computer to the electronic handheld device, or by docking the device in a stand-alone cradle. Often, the batteries of the electronic handheld device are charged through the connection with the fixed device as well.

The apparatuses and methods for connecting a electronic handheld device to a larger computer currently available rarely do more than exchange data and/or charge batteries. For example, while the electronic handheld device is docked with the fixed device, the electronic handheld device sits in open view, either in a stand-alone cradle, or resting directly on a desk or other surface. The apparatus described herein accomplishes the additional purpose of securing the electronic handheld device to protect the electronic handheld device from theft and damage.

Additionally, the apparatus includes a system of interchangeable trays which receive a variety of electronic handheld devices such that the apparatus described herein can be used to connect a particular fixed device universally with any electronic handheld device. Thus, the apparatus solves several complex problems encountered when attempting to efficiently manage the connection between an electronic handheld device and a fixed advice.

FIG. 1 is a perspective view diagram illustrating one embodiment of an apparatus in accordance with the present invention. FIG. 1 illustrates a secure storage bay 100 receiving an electronic handheld device 102. Any suitable electronic handheld device may be used. Examples of electronic handheld devices include, but are not limited to, a personal digital assistant, a media player, a telephone, a camera, a gps, a video recorder, a heart rate monitor, and a computer input device such as a mouse or keyboard.

In one embodiment, a retractable tray 104 is shown extending outside the secure storage bay 100 to receive the electronic handheld device 102. The retractable tray 104 includes a surface 106 for receiving the electronic handheld device 102. The surface 106 includes electrical connectors for electronically connecting with the electronic handheld device 102. The retractable tray may be dynamically positional so as to allow the surface to be on an angle when the retractable tray is extended, which provides for increased utility when positioning or accessing the electronic portable device 102.

For example, when the retractable tray 104 extends, the surface tips up, for example, to between a 30° and 45° angle. The retractable tray 104 may also retract inside the secure storage bay to secure the electronic handheld device. Thus, in one embodiment, the retractable tray 104 has four states: retracted and unloaded, extended and unloaded, extended and loaded, retracted and loaded. The illustrated embodiment depicts the retractable tray 104 in the extended and loaded state. The surface 106 may be designed to correctly position the electronic handheld device 102 for retraction and electronic mating.

The secure storage bay 100 may include an exterior housing 108, which protects the electronic handheld device 102 when the retractable tray 104 is in the retracted and loaded state. In one embodiment, the exterior housing 108 may be sealed to protect the electronic handheld device 102 from environmental hazards, including dust, microscopic metal filings, and corrosive gases.

The secure storage bay 100 may include a locking mechanism 110 to further secure and protect the electronic handheld device 102 when the retractable tray 102 is in the retracted and loaded state. In one embodiment, the locking mechanism is operated mechanically by use of a key 110. Another embodiment incorporates an electric lock, which may be operated, for example, by use of a key, a key card, a keypad, radio control, finger print or other biometric information, or by software which allows the electronic handheld device 102 to be opened by the fixed electronic device. The locking mechanism 110 may be incorporated in the face plate 112 of the secure storage bay 110. In a further embodiment, the locking mechanism 110 may comprise an electro/mechanical lock that contains a sensor for communicating the status of the lock (i.e. locked or unlocked).

The face plate 112 may also contain other methods for controlling or communicating with the secure storage bay 100 or the electronic handheld device 102. For example, an open/close button 114 may also be included. By way of illustration, when the retractable tray 104 is in the closed loaded or closed unloaded state, pressing the open/close button 114 may cause the retractable tray 104 to extend. On the other hand, when the retractable tray 104 is in the open loaded or open unloaded state, pressing the open/close button 114 may cause the retractable tray 104 to retract.

As an example of an additional manner of controlling the device, a synchronize button 116 may be included on the face plate 112. When pressed, the synchronize button 116 may initiate a process of synchronizing electronic data in the electronic handheld device 102 with some other device such as a computer. The face plate 112, may also contain a device which can indicate the status of the secure storage bay 100. For example, the face plate 112 may include status LEDs 118.

Figure 2A:
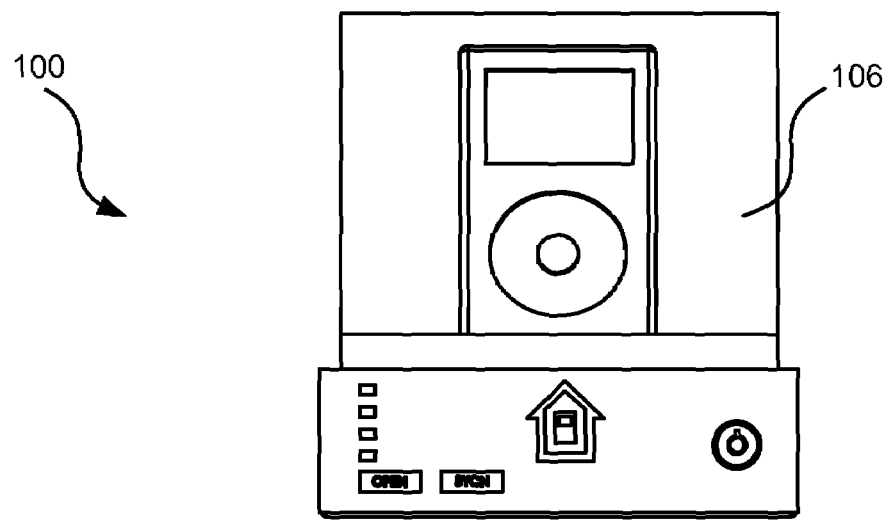
FIG. 2a is a front view diagram illustrating one embodiment of the secure storage bay in accordance with the present invention.

FIG. 2a is a front view diagram illustrating one embodiment of the secure storage bay 100 in accordance with the present invention. As described above, the tray 104 may extend and subsequently raise the surface 106 into an inclined configuration in order to position the electronic handheld device in a viewable position.

Figure 2B:
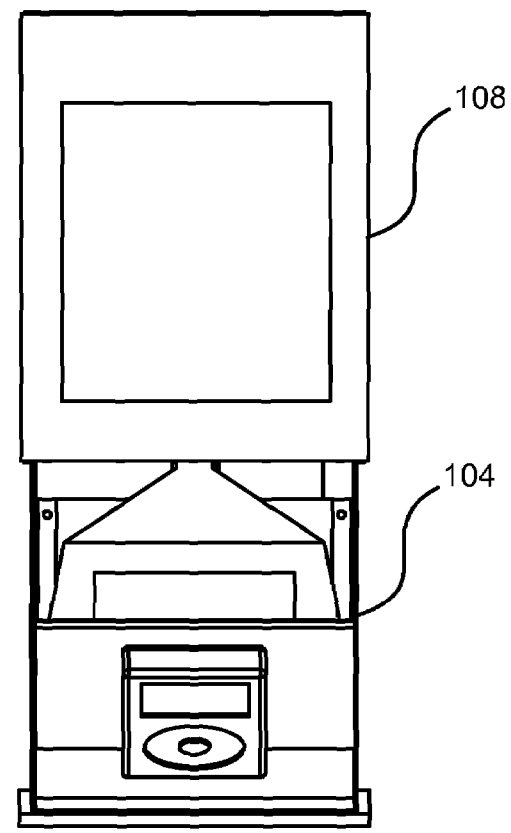
FIG. 2b is a top view diagram illustrating another embodiment of the secure storage bay in accordance with the present invention.

FIG. 2b is a top view diagram illustrating another embodiment of the secure storage bay 100 in accordance with the present invention. In one embodiment, the tray 104 extends outward from the exterior housing 108. The housing 108 may be configured with dimensions selected to conform with standard computer peripheral bays. For example, the housing 108 is configured with a width of about 5¼ inches in order to be insertable in standard CD Rom bays.

Figure 3A:
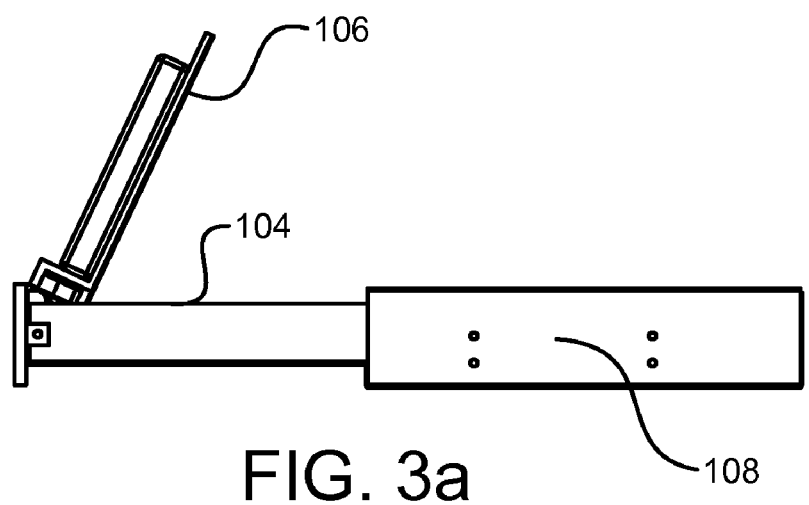
FIG. 3a is a side view diagram illustrating one embodiment of the secure storage bay in an open position in accordance with the present invention.

FIG. 3a is a side view diagram illustrating one embodiment of the secure storage bay 100 in an open position in accordance with the present invention. As depicted, when the tray 104 is in an extended position, the surface 106 may inclined. In one embodiment, the surface 106 is inclined to an angle of between about 20 and 75 degrees.

Figure 3B:
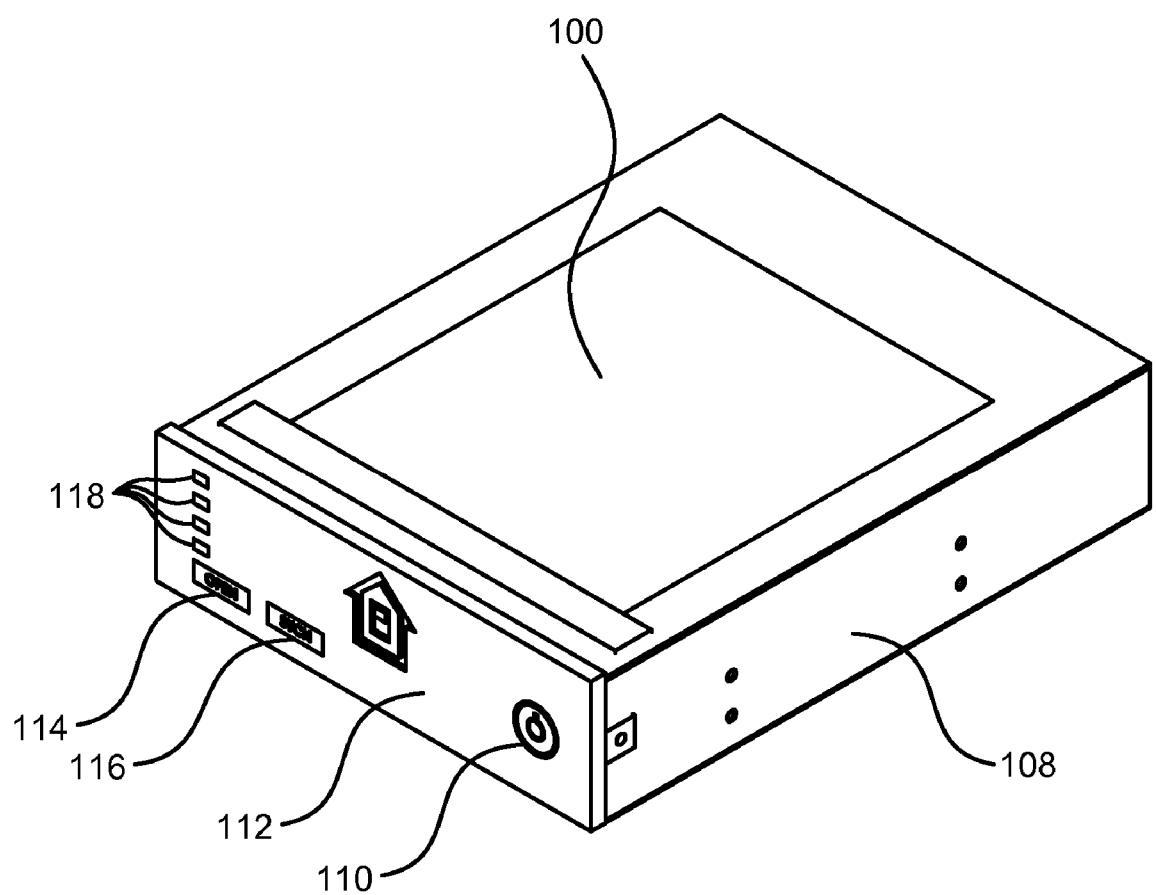
FIG. 3b is a perspective view diagram illustrating another embodiment of the secure storage bay in accordance with the present invention.

FIG. 3b is a perspective view diagram illustrating another embodiment of the secure storage bay 100 in accordance with the present invention. The depicted embodiment illustrates the secure storage bay 100 in a "closed" position. The surface 106 is in a position parallel to that of the tray 104 such that the tray together with the surface 106 and the device 102 are insertable inside the housing 108.

Figure 4:
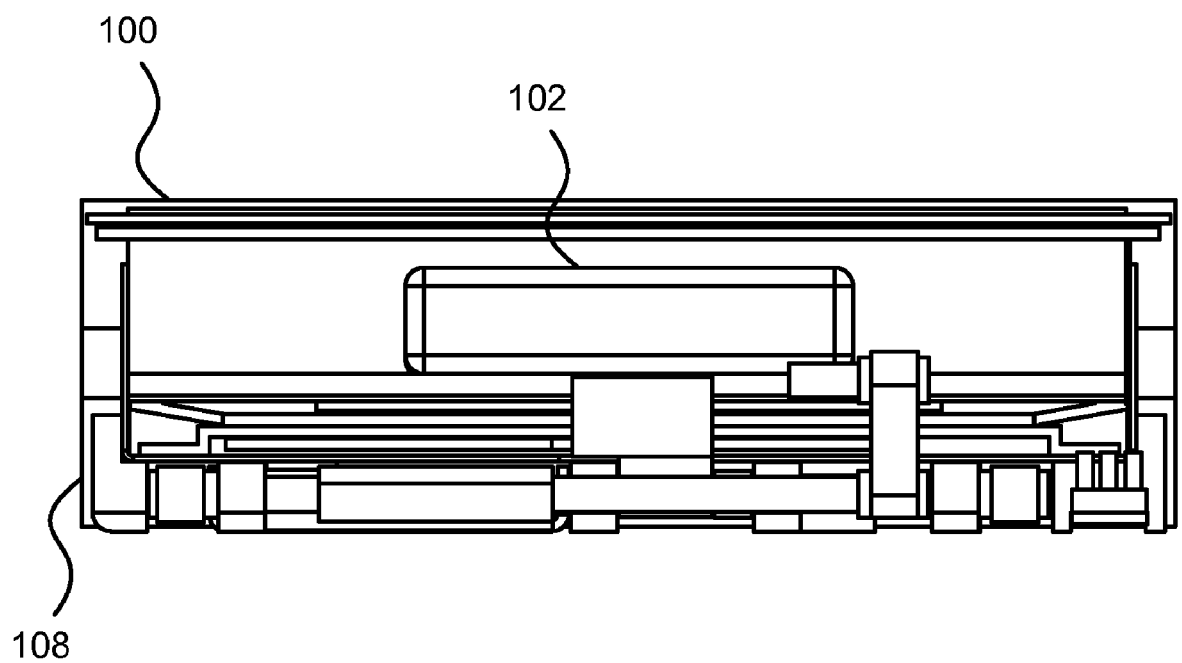
FIG. 4 is a rear view diagram illustrating another embodiment of the secure storage bay in accordance with the present invention.

FIG. 4 is a rear view diagram illustrating another embodiment of the secure storage bay 100 in accordance with the present invention. As depicted, in a retracted or secure position, the electronic device 102 is enclosed by the housing 108 such that it is impossible to remove the electronic device 102.

Figure 5A:
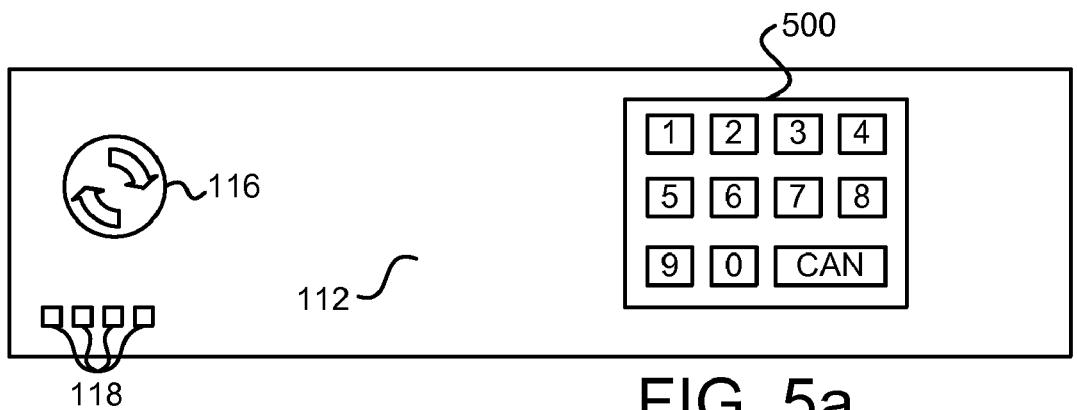
FIG. 5a is a front view diagram illustrating one embodiment of the face plate in accordance with the present invention.

FIG. 5a is a front view diagram illustrating one embodiment of the face plate 112 in accordance with the present invention. In this embodiment, a key-pad 500 operates the locking mechanism. The keypad 500 may be programmable to a custom passcode of any length according to the preferences of the user.

Figure 5B:
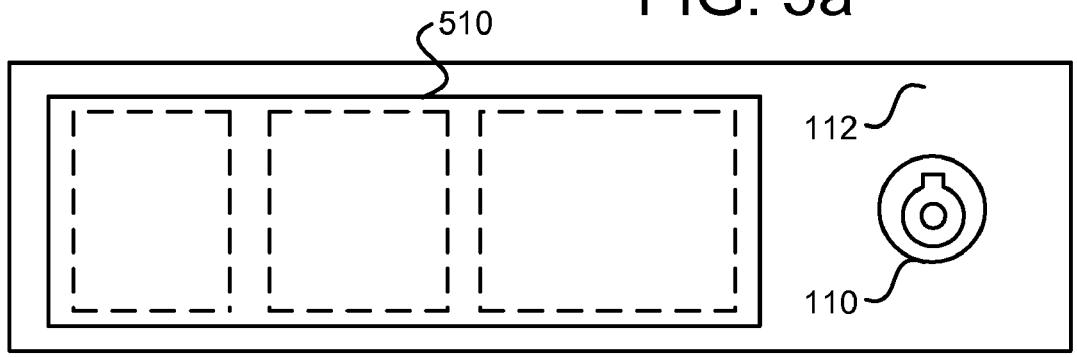
FIG. 5b is a front view diagram illustrating another embodiment of the face plate in accordance with the present invention.

FIG. 5b is a front view diagram illustrating another embodiment of the face plate in accordance with the present invention. In the embodiment of the face plate 112 includes an LCD screen 510. The LCD screen 510 may be touch sensitive. The LCD screen may allow the status of the secure storage bay 100 or electronic handheld device 102 to be displayed, or may display other information. A touch sensitive LCD screen 510 may allow the user to interact with the secure storage bay, for example, to cause the retractable tray 104 to extend or retract. A touch sensitive LCD screen 510 may also allow the user to interact with the electronic handheld device 102, for example, to cause electronic handheld device 102 to synchronize with another device.

As another illustration of this embodiment, the electronic handheld device 102 may be a mobile telephone. When the retractable tray 104 is in the closed loaded state, a telephone keypad may be displayed on the LCD screen 510. The user may then be able to input a telephone number into the LCD screen. The telephone number may be transmitted to the mobile telephone, which may then initiate the telephone call.

As another illustration of this embodiment, the electronic handheld device 102 may be a digital music player. When the retractable tray 104 is in the closed loaded state, the LCD screen 510 may display data related to the digital music currently being played. The touch sensitive LCD screen 510 may also allow the user to control the digital music played by the electronic handheld device 102, for example, by including touch sensitive "play" (▶), "stop" (■), "fast forward" (▶▶) and "next song" (▶▶│) areas on the LCD screen 510. The LCD screen 510 may also be configured with a plurality of user interfaces such that the LCD screen 510 is able to clone the user interface of the secure storage bay 90. This enables the user to use a familiar interface while the electronic device 102 is inside the secure storage bay 100.

Figure 5C:
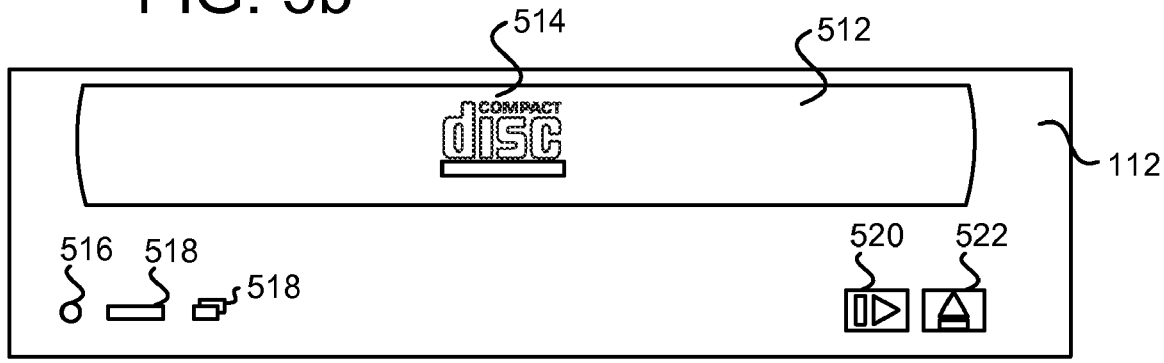
FIG. 5c is another front view diagram illustrating one embodiment of front panel in accordance with the present invention.

FIG. 5c is another front view diagram illustrating one embodiment of front panel 112 in accordance with the present invention. In one embodiment, the face plate is camouflaged so to appear as if the secure storage bay 100 were a standard optical disk drive. In the embodiment of FIG. 15, a false optical drive door 512 is shown, complete with a logo 514 implying that an optical disk drive is installed. A false earphone jack 516, false volume control 516, and a false status LED 518 may be clustered in the lower left corner. In the lower right corner, a false or real open/close button 522 and other false controls 520 may be included. This embodiment has the practical effect of further securing the electronic handheld device 102 decreasing the possibility that a potential thief will know that a secure storage bay 100 or electronic handheld device 102 is present.

Figure 5D:
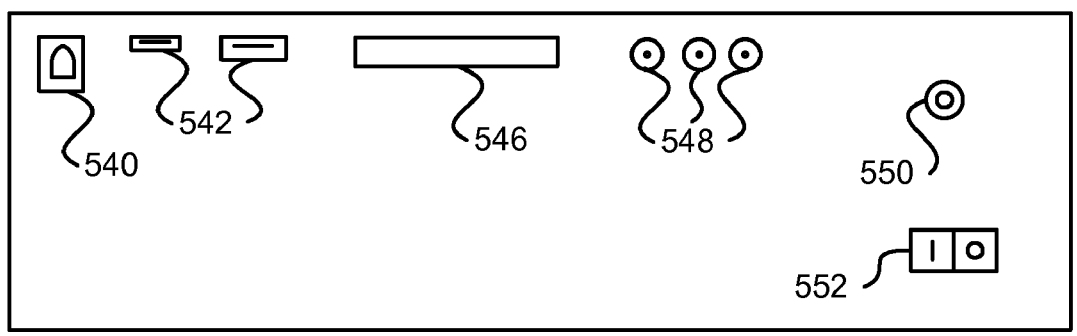
FIG. 5d is a rear view of one embodiment of the secure storage bay in accordance with the present invention.

FIG. 5d is a rear view of one embodiment of the secure storage bay 100 in accordance with the present invention. Many different methods may be used for electronically and electrically connecting the secure storage bay 100 to a fixed electronic device; indeed, many different methods of electronically and electrically connecting may be incorporated in a single embodiment of the secure storage bay 100. FIG. 5d shows such a device. The secure storage bay may connect with a fixed electronic device electronic through standardized electronic connections, such as a firewire (IEEE 1394) connection 540 or through different types of USB or USB 2.0 connections 542.

Future electronic connections 546 may also be incorporated, and space to allow for future connections may be built into the secure storage bay 100. Further, standardized audio jacks 548 may also be included; these may include both input and output jacks. Additionally, a mechanism for electrical connection with the fixed electronic device may also be included, for example, a standardized 5-volt power jack 550. An on/off switch 552 may also be included.

The schematic flow chart diagram that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
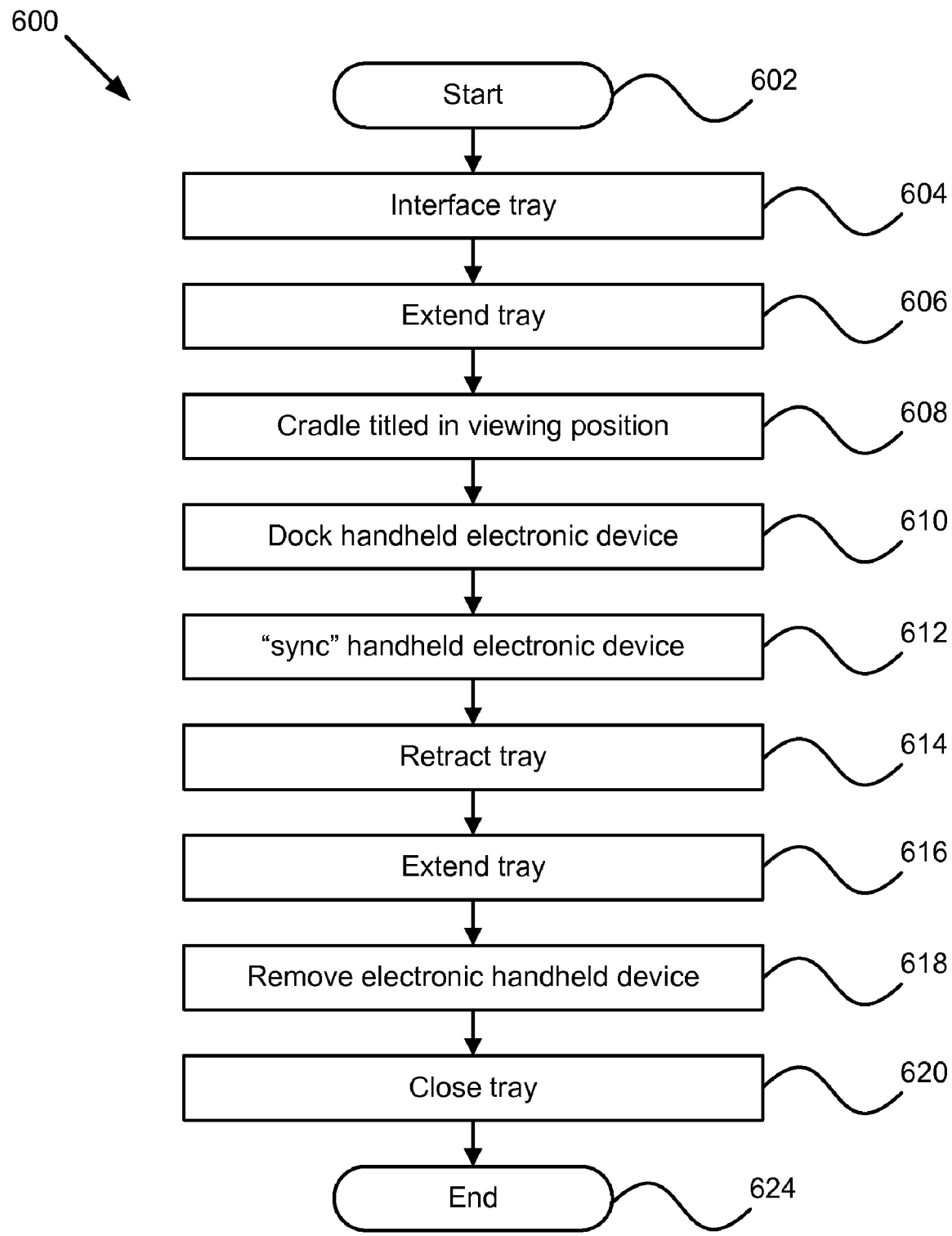
FIG. 6 is a schematic flow chart diagram illustrating one embodiment of a method for securely storing a handheld device in accordance with the present invention.

FIG. 6 is a schematic flow chart diagram illustrating one embodiment of a method for securely storing a handheld device in accordance with the present invention. illustrates a process 600 which may be used when the electronic handheld device 102 interacts with the secure storage bay 100. At start 602, the retractable tray is in the closed unloaded state. The user may interface 604 with the retractable tray 104, for example, by pressing the open/close button 114, or by interacting with the touch sensitive LCD screen 510, or through software installed on a fixed electronic device. The retractable tray 104 may then be extended 606 out of the exterior housing and the retractable tray 104 may be moved into the open unloaded state.

The surface 106 may tilt 608 so as to be in an optimal viewing position. The user may then dock 610 the electronic handheld device 102 with the surface 106. The retractable tray 104 is then in the open loaded state. The user may then cause the electronic handheld device 102 to interact with the fixed electronic device, for example, by "synchronizing" 612 the electronic handheld device 102 with the fixed electronic device, for example by pressing the synchronize button 116. The user may then cause the retractable tray 104 to retract 614, so that the secure storage bay 100 is in the closed loaded state. The user may extend 616 the retractable tray 104 once again into the open loaded state. The user may then remove 618 the electronic handheld device 102 from the surface 106. The user may then cause the retractable tray 104 to close 620, returning the secure storage bay 100 to the closed unloaded state. Thus, the end state 622 is the same as the start state 600.

Figure 7A:
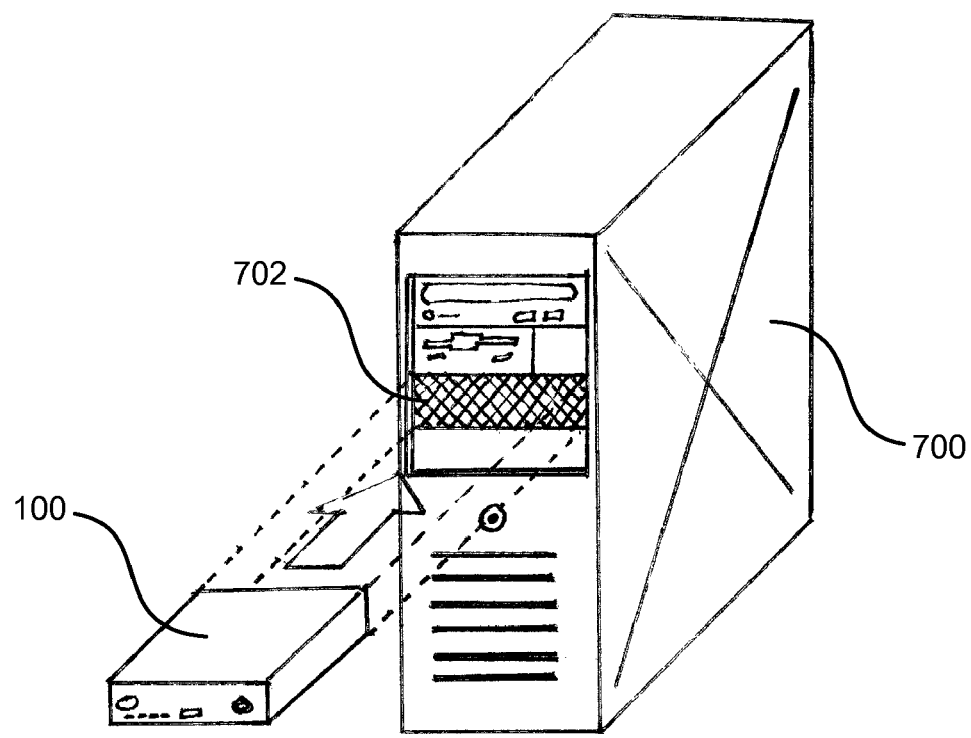
FIG. 7a is a perspective view diagram illustrating one embodiment of the secure storage bay in accordance with the present invention.

FIG. 7a is a perspective view diagram illustrating one embodiment of the secure storage bay in accordance with the present invention. As depicted, the secure storage bay 100 may be installed within a fixed electronic device. There is a vast array of fixed devices within which the apparatus may be installed, and a vast array of electronic handheld devices which may dock within the apparatus and nothing contained herein should be presumed to limit the embodiments covered. By way of example only, FIG. 20 shows a secure storage bay 100 being installed in a desktop computer 700. The secure storage bay 100 may be installed within a standard 5½" drive bay 702 in a desktop computer.

Figure 7B:
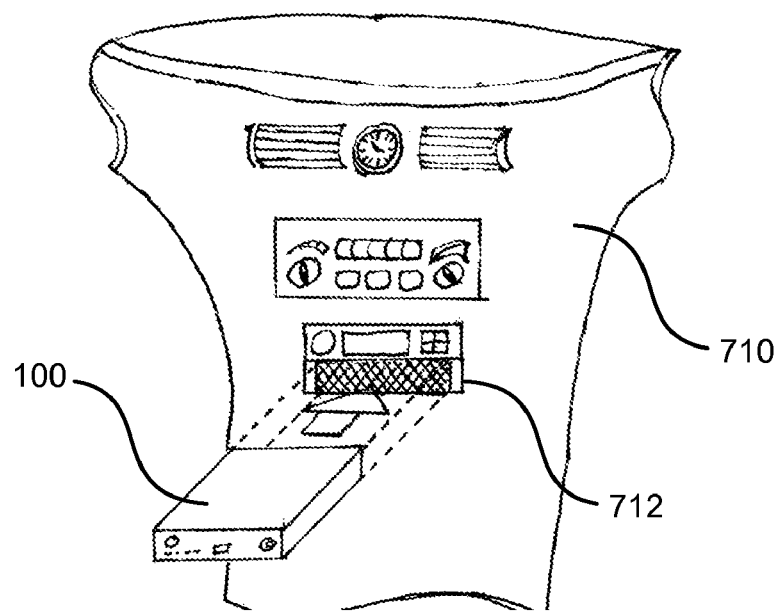
FIG. 7b is a perspective view diagram illustrating another embodiment of the secure storage bay in accordance with the present invention.

FIG. 7b is a perspective view diagram illustrating another embodiment of the secure storage bay in accordance with the present invention. By way of example only, FIG. 7b shows the secure storage bay 100 being installed in an automobile dashboard 710. The secure storage bay 100 may be installed within the standard space in an automobile dashboard for audio equipment 712.

By way of illustration of one use of this embodiment, the user may use a portable music player, such as an iPod™, as the portable electronic device 102. When the user gets into her automobile, she may extend the retractable tray 104 and dock her portable music player on the surface 106 of the secure storage bay 100. She may then retract the retractable tray 104 along with the portable music player. With the retractable tray 104 in the closed loaded position, the portable music player will be secure during the journey. Meanwhile, because the secure storage bay 100 is connected electrically and electronically to the automobile dashboard, the user may play music with the portable music player through the sound system of the automobile. The portable music player, which is secured and hidden from view, may be operated by use of a touch sensitive LCD screen 1600, for example.

Figure 8A:
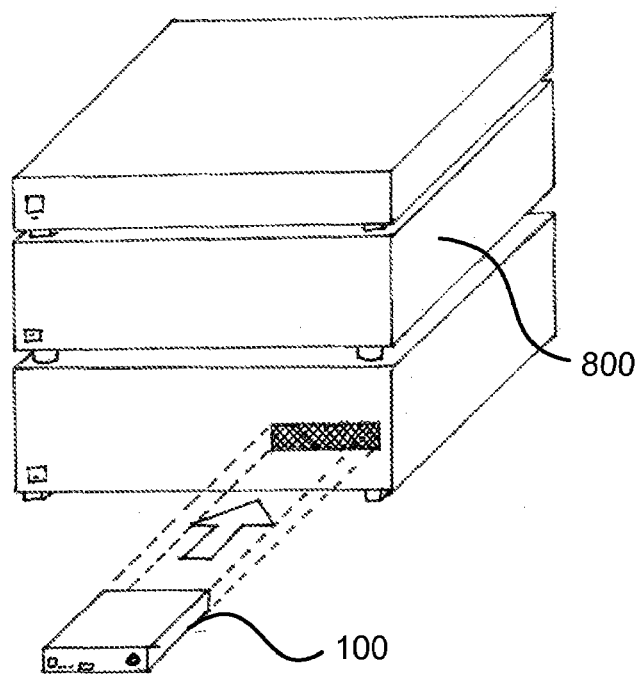
FIG. 8a is a perspective view diagram illustrating one embodiment of the secure storage bay insertable in a home entertainment system in accordance with the present invention.

FIG. 8a is a perspective view diagram illustrating one embodiment of the secure storage bay 100 insertable in a home entertainment system in accordance with the present invention. The secure storage bay 100 may be installed in home entertainment system 800. In the depicted embodiment, the secure storage bay 100 is shown being installed within another component of the entertainment system. However, the secure storage bay 100 may also be a stand-alone component. The user may play video or audio files stored on the electronic handheld device 102 through the home entertainment system 800. The user may also load video or audio files onto the electronic handheld device 102 through the home entertainment system 2200.

As another example of an embodiment, the secure storage bay 100 may be installed within a laptop computer. The electronic handheld device 102 may be a mobile telephone. The user may dock the mobile telephone in the secure storage bay 100 and, in either the open loaded or closed loaded state, can connect to the Internet or send a fax through the mobile telephone connection.

Figure 8B:
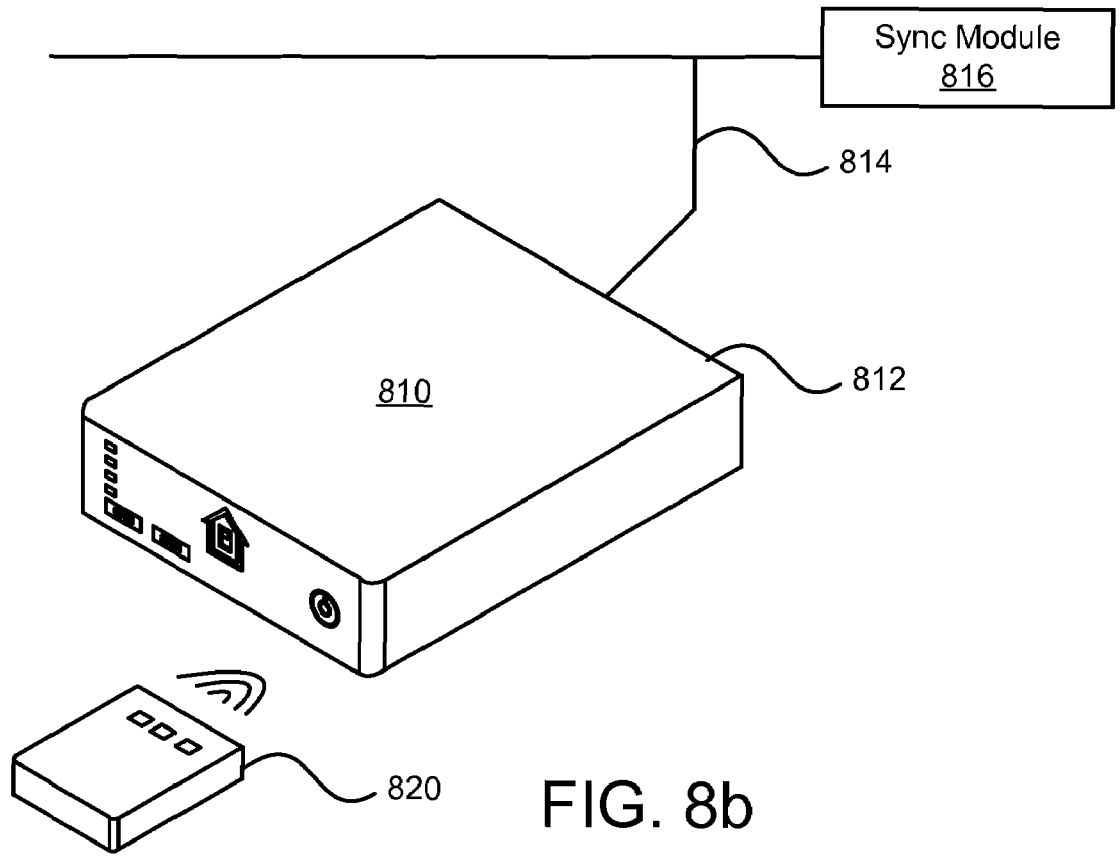
FIG. 8b is a perspective view diagram illustrating an alternative embodiment of the secure storage bay 100 in accordance with the present invention.

FIG. 8b is a perspective view diagram illustrating an alternative embodiment of the secure storage bay 100 in accordance with the present invention. In one embodiment, the secure storage bay 100 comprises a standalone unit 810 in a housing 812. The standalone unit 810 may be connected with a data communications network or link 814 for syncing the device over a network. Alternatively, the standalone unit may be directly connected to a computer or electronic device using, for example, USB, IDE, SCSI, SATA, proprietary connections, etc.

Connected with the data communications network 814 is a sync module 816 for syncing the electronic handheld device 102 with a computer, for example. The sync module 816 is configured to automatically recognize the presence of an electronic handheld device and may present a user with options for adding and removing content from the electronic handheld device. Additionally, the sync module 816 may be configured to control playback of content on the electronic handheld device and/or remotely play content from the electronic handheld device on the computer or fixed electronic device.

In a further embodiment, the secure storage bay 100 may include a remote control 820 for controlling the secure storage bay 100 and subsequently the electronic device. The secure storage bay 100 may be configured with various wireless or radio modules such as, but not limited to, Bluetooth for enabling a user to listen with wireless headphones.

In one embodiment, two sets of multi-pin connectors may be used in conjunction with replaceable surfaces 106 to establish a universal system to allow any electronic handheld device 102 to be used with a secure storage bay 100. Thus, the secure storage bay 100 may include a system of interchangeable surfaces 106 which, on the one hand, may mateably connect electronically and electrically with the retractable tray 104 and, on the other hand, may mateably connect electronically and electrically with a particular electronic handheld device 102. In this manner, a secure storage bay 100, installed in a particular fixed electronic device, may receive different electronic handheld devices 102. Thus, by way of illustration and not limitation, a personal digital assistant may be recharged and synchronized with the a computer using the secure storage bay 100, then, a handheld media player may be recharged and files transferred using the same secure storage bay.

Many electronic handheld devices 102 have multi-pin connectors to allow the electronic handheld device 102 to connect electronically and/or electrically with other devices. In one embodiment of the secure storage bay 100, the retractable tray 104 may be interchangeable to accommodate a variety of electronic handheld devices.

FIG. 9 is a table illustrating one embodiment for pinouts in accordance with the present invention. The retractable tray 104 may mateably connect to the secure storage bay 100 through a pair of first set of electrical connectors. One embodiment of the first set of electrical connectors is the multi-pin electrical connectors illustrated in FIG. 23. The signals from the pinouts from the electronic handheld device 102 may be reordered into an arrangement that is standardized for the secure storage bay 100; FIG. 23 includes an example of this technique using a 68-pin connector. Thus, each replaceable retractable tray 104 may be connected to the secure storage bay 100 by the multi-pin electrical connectors. Each replaceable retractable tray 104 may also include a method for connecting with a particular electronic handheld device 102 by use of a second set of electrical connectors, for example, a second multi-pin electrical connectors.

Through this second set of electrical connectors, data and power may be transferred between the particular electronic handheld device 102 and the replaceable tray 104 by use of the multi-pin connector. Data and power may be transferred between the replaceable tray 104 and the secure storage bay 100 through the first set of electrical connectors. Data and power may be transferred between the secure storage bay 100 and the fixed electronic device, for example, through any of the methods discussed in paragraph 116 above. Thus, a secure storage bay 100 installed in a particular fixed electronic device may, through the use of replaceable retractable trays 104, receive any electronic handheld device 102.

A limited illustration of this method may be useful to understand the invention. The illustration intentionally incorporates specific examples to aid in understanding the invention; the use of specific examples is not intended to limit the array of possibilities of the use of the invention.

A secure storage bay 100 may be installed in a desk top computer, as illustrated in FIG. 20. Using a 68 pin connector and physical mounts, a replaceable retractable tray 104 may be attached to the secure storage bay 100. The replaceable retractable tray 104 may include a surface 106 that may be designed to receive an iPod™ digital music player. The surface 106 may be designed to receive the iPod™ digital music player both because the surface 106 may be molded to physically receive one and because the surface 106 may include a multi-pin connector that specifically matches the multi-pin connector on the iPod™. An iPod™ digital music player may be placed on the surface such that the multi-pin connector on the iPod™ connects with the corresponding multi-pin connector on the surface 106 of the retractable tray 104. Music may be transferred from the iPod™ digital music player to the desktop computer, or from the desktop computer to the iPod™ digital music player. The batteries of the iPod™ digital music player may be charged. The retractable tray 104 may be retracted and the iPod™ digital music player may be stored within the secure storage bay 100.

The retractable tray 104 may be extended and the iPod™ digital music player may be removed. The retractable tray 104 may be removed and another retractable tray 104 may be attached to the secure storage bay 100 using the 68-pin connector and physical mounts. The second retractable tray 104 may include a surface 106 designed to receive a PalmOne™ personal digital assistant. A PalmOne™ personal digital may be placed on the surface such that the multi-pin connector on the PalmOne™ connects with the corresponding multi-pin connector on the surface 106. The PalmOne™ personal digital assistant may be "synced" with the desktop computer and the batteries of the PalmOne™ personal digital assistant may be charged.

The PalmOne™ personal digital assistant may be removed. The second retractable tray 104 may be removed and a third retractable tray 104 may be attached to the secure storage bay 100 using the 68-pin connector and physical mounts. The third retractable tray 104 may include a surface 106 designed to receive a Motorola™ mobile telephone. Data may be transferred between the Motorola™ mobile telephone and the desktop computer and the telephone's batteries may be charged.

Figure 10:
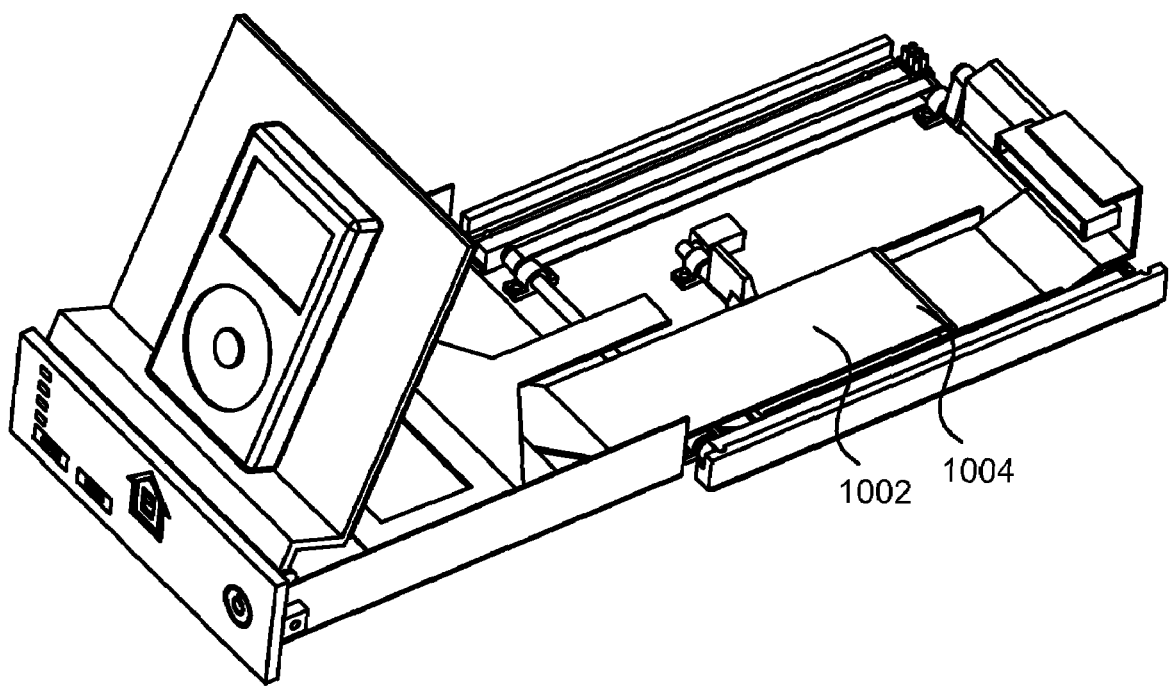
FIG. 10 is a perspective view diagram illustrating one embodiment of the inner components of the secure storage bay 100 in accordance with the present invention.

FIG. 10 is a perspective view diagram illustrating one embodiment of the inner components of the secure storage bay 100 in accordance with the present invention. One skilled in the art will recognize the various components required for extending and lifting the electronic device 102. Further discussion will not be given herein. Of particular note, however, is the data connection 1002. The data connection 1002 may comprise a high density ribbon similar to that of SCSI or IDE data connections. The data connection 1002 is configured with a loop 1004 such that the tray 104 may extend and not over extend the data connection.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A secure storage bay for an electronic handheld device, comprising
   a retractable tray having a surface for receiving at least one of a plurality of electronic handheld devices;
   an electrical connector within the retractable tray for making electrical connection with the electronic handheld device;
   the retractable tray having an exterior housing with electrical connectors for being received within a fixed electronic device; and
   an adapter having a plurality of electrical connectors configured to mateably connect with the electrical connector on the retractable tray and configured to mateably connect with a respective plurality of connectors on the plurality of electronic handheld devices, wherein the secure storage bay is configured to receive each of the plurality of electronic handheld devices on the retractable tray within the exterior housing, with the retractable tray in a retracted state of use, wherein the electronic handheld device remains mateably connected while in the retracted state of use.

2. The secure storage bay of claim 1, the plurality of electrical connectors further comprising a first set of electrical connectors for mateably connecting with the electrical connector on the retractable tray and a second set of electrical connectors for mateably connecting with the electronic handheld devices.

3. The secure storage bay of claim 1, further comprising a locking mechanism disposed on a faceplate connected with the retractable tray such that the locking mechanism secures the retractable tray in a closed position.

4. The secure storage bay of claim 1, further comprising a sync module for accessing the electronic handheld device through the fixed electronic device when the electronic handheld device is secured in the secure storage bay.

5. The secure storage bay of claim 1, further comprising a dummy faceplate attached to the retractable tray.

6. The secure storage bay of claim 1, further comprising an LCD screen attached to the retractable tray.

7. The secure storage bay of claim 6, wherein the LCD screen is configured to emulate a control layout of the electronic device.

8. The secure storage bay of claim 1, wherein the retractable tray comprises a dynamically positionable cradle.

9. The secure storage bay of claim 1, wherein the fixed electronic device is selected from a group consisting of a computer, a stereo receiver, a car stereo, and an external housing in communication with a computer.

10. A system for securely storing an electronic handheld device, the system comprising
    a retractable tray configured to be moved between an extended state of use and a retracted state of use, the retractable tray having a surface for universally receiving at least one of a plurality of electronic handheld devices;
    an electrical connector within the retractable tray for making electrical connection with the electronic handheld device;
    the retractable tray having an exterior housing with electrical connectors for being received within a fixed electronic device; and
    a sync module for accessing the electronic handheld device over a data communications link when the electronic handheld device is secured in a secure storage bay formed by the retractable tray and the exterior housing;
    wherein the secure storage bay is configured to receive each of the plurality of electronic handheld devices on the retractable tray within the exterior housing, with the retractable tray in the retracted state of use.

11. The system of claim 10, further comprising an adapter having a first set of electrical connectors for mateably connecting with the electrical connector on the retractable tray and a second set of electrical connectors for mateably connecting with the electronic handheld device.

12. The system of claim 10, further comprising a locking mechanism for securing the retractable tray in the closed position.

13. The system of claim 10, further comprising a dummy faceplate attached to the retractable tray, wherein the dummy faceplate includes a false optical drive door configured to camouflage the secure storage bay.

14. The system of claim 10, further comprising an LCD screen attached to the retractable tray.

15. The system of claim 10, wherein the LCD screen is configured to emulate a control layout of the electronic device, wherein the LCD screen comprises a user interface screen configured to enable operation of the electronic device by the user interface screen when the retractable tray is closed and loaded with the electronic device inside the exterior housing.

16. The system of claim 10, wherein the retractable tray comprises a dynamically positionable cradle.

17. The system of claim 10, wherein the fixed electronic device is selected from a group consisting of a computer, a stereo receiver, a car stereo, and an external housing in communication with a computer.

18. A method for securely storing an electronic handheld device, the method comprising receiving at least one of a plurality of distinct electronic handheld devices on a retractable tray movably supported on an exterior housing;

selecting at least one of a plurality of adapters for connecting the retractable tray with the at least one of the plurality of distinct handheld devices;

making an electrical connection with the electronic handheld device through the adapter to the retractable tray; and retracting the electronic handheld device while connected to the retractable tray within an exterior housing, the exterior housing having electrical connectors for connecting with a fixed electronic device.

19. The method of claim 18, further comprising mateably connecting the electrical connector on the retractable tray with the electronic handheld device.

20. The method of claim 18, further comprising securing the retractable tray in a closed position.

\* \* \* \* \*

UNITED STATES PATENT AND TRADEMARK OFFICE
CERTIFICATE OF CORRECTION

PATENT NO.        : 7,580,254 B2
APPLICATION NO. : 11/551209
DATED             : August 25, 2009
INVENTOR(S)       : David Anderson It is certified that error appears in the above-identified patent and that said Letters Patent is hereby corrected as shown below:

Column 1, Line 11
 "BAY FOR AN EXLECTRONIC"---should read "BAY FOR AN ELECTRONIC"

Column 1, Line 39
 "connecting a electronic"---should read "connecting an electronic"

Column 5, Line 1
 "connecting a electronic"---should read "connecting an electronic"

Column 5, Line 18
 "a fixed advice"---should read "a fixed device"

Column 8, Line 15
 "invention. illustrates a"---should read "invention. Figure 6 illustrates a"

Column 10, Line 27
 "a second multi-pin"---should read "a second set of multi-pin"

Column 11, Line 4
 "personal digital may"---should read "personal digital assistant may"

Signed and Sealed this

Tenth Day of November, 2009

David J. Kappos
*Director of the United States Patent and Trademark Office*